(12) United States Patent
Kubota

(10) Patent No.: US 10,085,032 B2
(45) Date of Patent: Sep. 25, 2018

(54) ENCODING DEVICE, ENCODING METHOD, AND COMPUTER READABLE STORAGE MEDIUM

(71) Applicant: FUJITSU LIMITED, Kawasaki-shi, Kanagawa (JP)

(72) Inventor: Tomonori Kubota, Kawasaki (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 0 days.

(21) Appl. No.: 15/467,409

(22) Filed: Mar. 23, 2017

(65) Prior Publication Data

US 2017/0280145 A1 Sep. 28, 2017

(30) Foreign Application Priority Data

Mar. 25, 2016 (JP) .................................. 2016-062809

(51) Int. Cl.
*G06K 9/36* (2006.01)
*H04N 19/176* (2014.01)
*H04N 19/182* (2014.01)

(52) U.S. Cl.
CPC ......... *H04N 19/176* (2014.11); *H04N 19/182* (2014.11)

(58) Field of Classification Search
CPC ....... H04N 19/00121; H04N 19/00139; H04N 19/00212; H04N 19/00278; H04N 19/00375; H04N 19/00884; H04N 19/00951
See application file for complete search history.

(56) References Cited

U.S. PATENT DOCUMENTS 6,912,317 B1 *  6/2005  Barnes ................. G06F 19/321
                                                                    375/E7.129
2002/0073429 A1 *  6/2002  Beane ................... G06F 19/321
                                                                    375/240.01

FOREIGN PATENT DOCUMENTS

JP       08-205144      8/1996
JP       2005-252556    9/2005

* cited by examiner

*Primary Examiner* — Duy M Dang
(74) *Attorney, Agent, or Firm* — Staas & Halsey LLP

(57) ABSTRACT

A device including: a processor configured to: generate compressed data of an image based on a range of pixel value, transmit the compressed data of the image to another device, when a range of pixel value is changed from a first range to a second range, generate difference information of the image, the difference information being information for each third encoding block of the plurality of encoding blocks of the image that indicates a difference between missing information in the third encoding block by a second compression scheme and missing information in the third encoding block by a first compression scheme, each third encoding block being a encoding block that include no pixel whose value is within the first range and that includes a pixel whose value is within the second range, and transmit the difference information of the image to the other device.

8 Claims, 22 Drawing Sheets

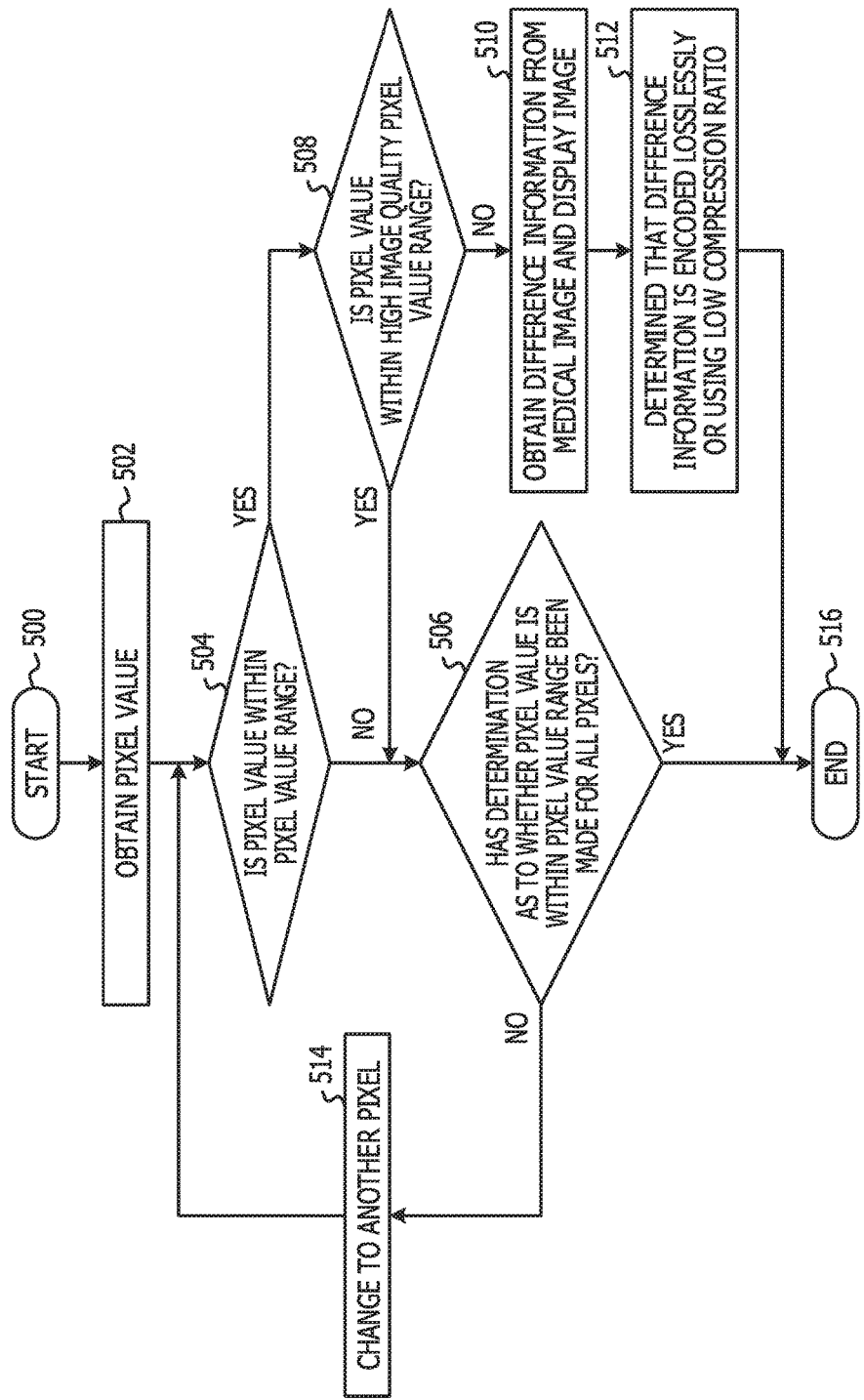

FIG. 11A — MEDICAL IMAGE: PIXEL VALUES OF PROCESSING TARGET BLOCK
FIG. 11B — DISPLAY IMAGE: PIXEL VALUES OF PROCESSING TARGET BLOCK
FIG. 11C — DIFFERENCE INFORMATION

FIG. 15

|  | MINIMUM PIXEL BALUE | MAXIMUM PIXEL VALUE |
|---|---|---|
| HIGH IMAGE QUALITY PIXEL VALUE RANGE 1 | 100 | 150 |
| HIGH IMAGE QUALITY PIXEL VALUE RANGE 2 | | |
| HIGH IMAGE QUALITY PIXEL VALUE RANGE 3 | | |
| ... | | |

FIG. 16

|  | MINIMUM PIXEL BALUE | MAXIMUM PIXEL VALUE |
|---|---|---|
| HIGH IMAGE QUALITY PIXEL VALUE RANGE 1 | 100 | 150 |
| HIGH IMAGE QUALITY PIXEL VALUE RANGE 2 | 200 | 220 |
| HIGH IMAGE QUALITY PIXEL VALUE RANGE 3 |  |  |
| ... |  |  |

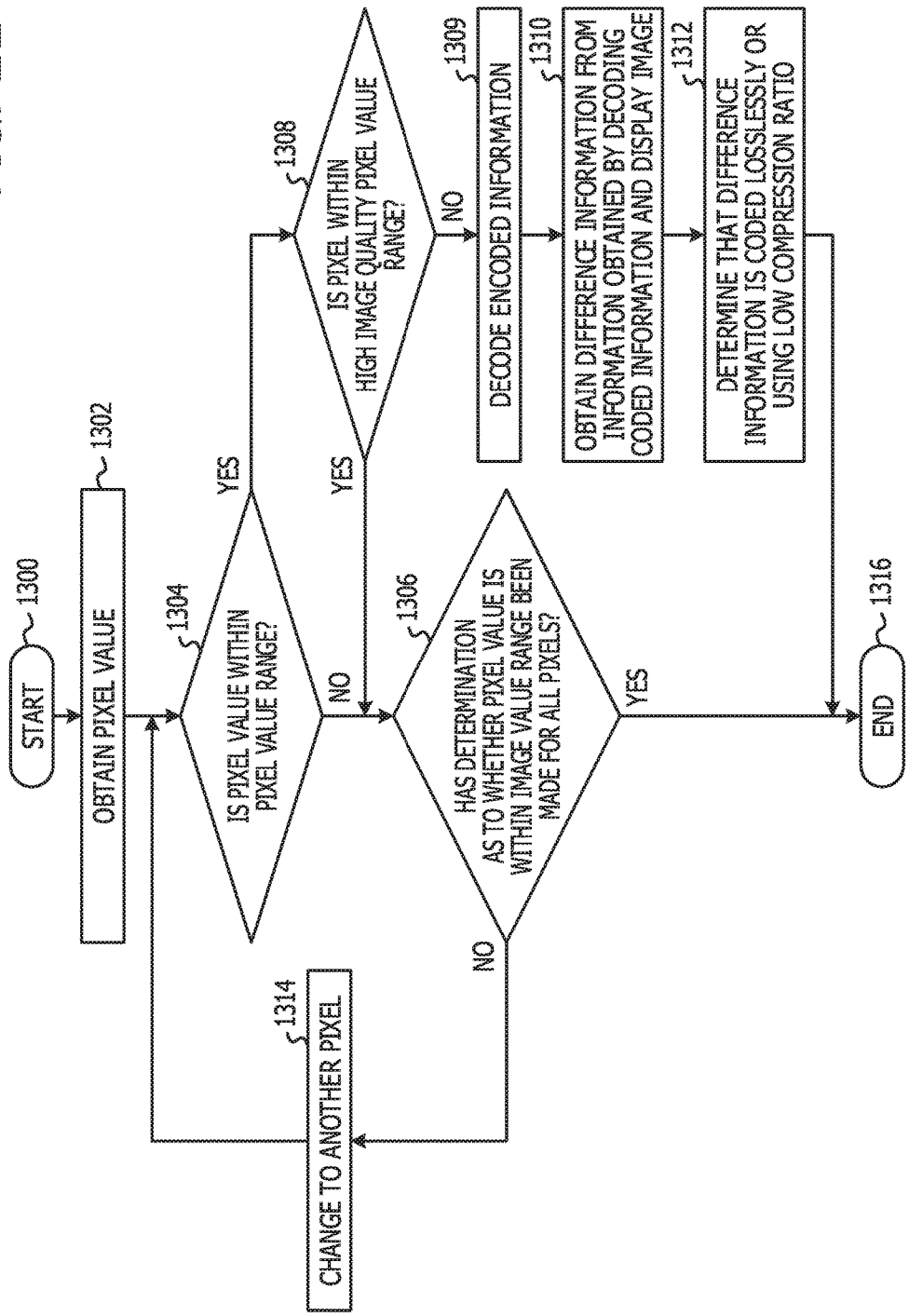

ENCODING DEVICE, ENCODING METHOD, AND COMPUTER READABLE STORAGE MEDIUM

CROSS-REFERENCE TO RELATED APPLICATION

This application is based upon and claims the benefit of priority of the prior Japanese Patent Application 2016-062809, filed on Mar. 25, 2016, the entire contents of which are incorporated herein by reference.

FIELD

The embodiments discussed herein are related to an encoding device, an encoding method, and a program.

BACKGROUND

There is a system in which medical images captured by medical institutions are stored in a data center, and the stored medical images are shared between the medical institutions when the medical institutions access the data center. The terminal provided in the medical institution communicates with a server in real time through a network such as the Internet, and diagnosis may be performed so that a medical image that have been obtained by the communication is caused to be displayed on the terminal provided in the medical institution. As described above, any medical institution having a permission to access the medical images may utilize the medical images. That is, in the system, the medical images are shared between the medical institutions.

The pixel value of each pixel of the medical image indicates an X-ray absorption coefficient. The range of an X-ray absorption coefficient is different depending on a living tissue such as water, an adipose tissue, a soft tissue, or a bone, and the range of an X-ray absorption coefficient corresponding to each interpretation target is defined by a proportion of the living tissues such as water, an adipose tissue, a soft tissue, and a bone that constitute brain, heart, lung or the like that is the interpretation target of the medical image, so that a pixel value range corresponding to the interpretation target is defined based on the defined range of the X-ray absorption coefficient.

FIG. 1 is a diagram illustrating an example of pixel value ranges corresponding to interpretation targets. Parts A to D represent interpretation targets. An absolute value of each of the pixel value ranges and a relative relationship between the ranges are merely examples, but the part A is, for example, an example of a pixel value range of brain, and the part B is, for example, an example of a pixel value range of heart, the part C is, for example, an example of a pixel value range of lung, and the part D is, for example, an example of a pixel value range of liver.

Typically, a data amount of a medical image is very large. For example, the medical image has about 9,000 pixels in each of the vertical and horizontal directions. Recently, the medical image is displayed with a color depth of 12 to 16 bits, and each of the about 9,000 pixels in each of the vertical and horizontal directions has data corresponding to the color depth, so that a data amount of each of the medical images becomes very large.

As described above, the medical image has a large data amount, so that the data of the medical image is compressed and transmitted to a terminal. As an image encoding scheme used for the compression, for example, there are JPEG, MPEG-2, H.264/AVC, H.265/HEVC, and the like.

In addition, there is a case in which a medical image is displayed on a terminal so that a pixel value range is specified for the medical image. The color depth of the medical image corresponds to 12 to 16 bits, but a color depth of an image, which is allowed to be displayed on a typical display, is 8 bits, so that it is difficult to perform display of the whole pixel value range of the medical image on the terminal as is. Therefore, in this case, in the pixel value range of the medical image, a pixel value range having a certain range is displayed so as to match the color depth of the display so that mapping is performed. The pixel value range having the certain range is, for example, a pixel value range corresponding to an interpretation target.

Here, the mapping is processing in which the pixel value corresponding to the color depth of the medical image is associated with the pixel value corresponding to the color depth of the display, and as a scheme of the mapping, for example, there is a scheme regulated by Digital Imaging and Communication in Medicine (DICOM) that is a standard in which a communication protocol between medical imaging devices is defined.

Such a specification of the pixel value range is performed each time an interpretation target is changed. In addition, even in the same interpretation target, a pixel value range is changed each time an instruction is issued that specifies a pixel value range to make it easier to see the image. That is, each time a pixel value range is changed, an image based on the changed pixel value range is transmitted to the terminal.

A technology by which whether the pixel value of each pixel of image data exists within a certain range is determined, and high precision encoding is performed merely on pixels within the certain range, and low precision encoding is performed on pixels outside the certain range is discussed in Japanese Laid-open Patent Publication No. 2005-252556. In addition, a technology by which an image is encoded under different encoding conditions between a specified area and an area other than the specified area in the image is discussed in Japanese Laid-open Patent Publication No. 8-205144.

SUMMARY

According to an aspect of the invention, a device includes a memory, and a processor coupled to the memory and the processor configured to: when obtaining an image that is divided into a plurality of encoding blocks each including one or more pixels, generate compressed data of the image based on a range of pixel value, each of at least one first encoding block of the plurality of encoding blocks in the compressed data of the image being compressed using a first compression scheme, each of the at least one first encoding block being a encoding block that includes a pixel whose value is within the range of pixel value, each of at least one second encoding block of the plurality of encoding blocks in the compressed data of the image being compressed using a second compression scheme, each of the at least one second encoding block being a encoding block that includes no pixel whose value is within the range of pixel value, missing information in each of the at least one first encoding block by the first compression scheme being less than missing information in each of the at least one second encoding block by the second compression scheme, transmit the compressed data of the image to another device, in response to the compressed data of the image being transmitted to the other device in case where the range of pixel value is a first range, when the range of pixel value is changed from the first range to a second range, generate difference information of the image, the difference information being information for each of at least one third encoding block of the plurality of encoding blocks of the image that indicates a difference between missing information in the third encoding block by the second compression scheme and missing information in the third encoding block by the first compression scheme, each of the at least one third encoding block being a encoding block that include no pixel whose value is within the first range and that includes a pixel whose value is within the second range, and transmit the difference information of the image to the other device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a flowchart illustrating a procedure example in which a compression ratio at the time of interpretation target change is determined in the first embodiment;

FIG. 11A is a diagram illustrating an example of pixel values of a medical image;

FIG. 11B is a diagram illustrating an example of pixel values of a display image;

FIG. 11C is a diagram illustrating an example in which difference information is obtained from each pixel value of a medical image and a pixel value obtained from a display image;

FIG. 15 is a diagram illustrating an example of a high image quality pixel value range;

FIG. 16 is a diagram illustrating an example after the high image quality pixel value range has been updated;

FIG. 22 is a flowchart illustrating a procedure example in which a compression ratio at the time of interpretation target change is determined in the third embodiment.

DESCRIPTION OF EMBODIMENTS

There is a case in which a single image is displayed on a terminal so that a pixel value range of the image is changed. In the case in which the pixel value range is changed as described above, when image information of a certain portion of the image, which includes pixel data within the changed pixel value range has been encoded at a high compression ratio before the change in the pixel value range, it is desirable that the image information including the pixel data is recoded losslessly or using a low compression ratio, and then transmission of the image information is performed in order to express the certain portion of the image with high definition.

An object of an embodiment is to provide an encoding device, an encoding method, and a program in which a data amount that is to be transmitted to a decoding device is reduced.

Embodiments of the technology discussed herein are described with reference to drawings.

First Embodiment

Figure 1:
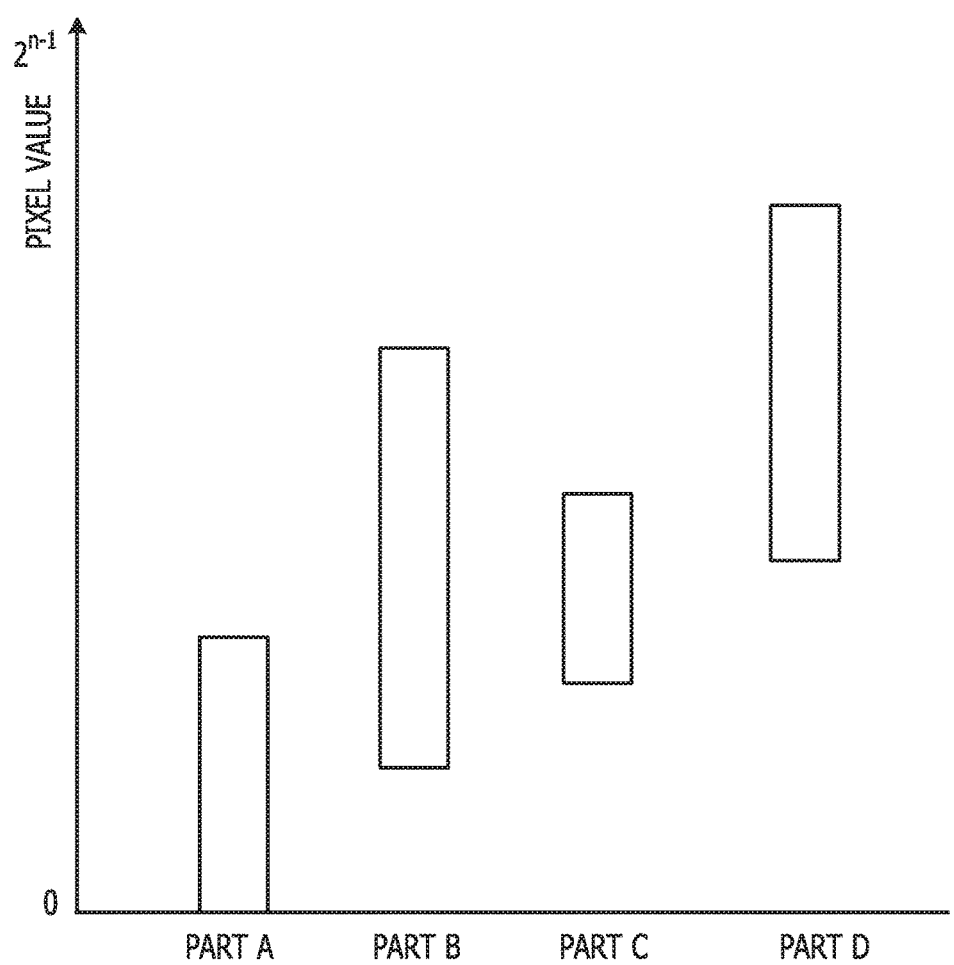
FIG. 1 is a diagram illustrating an example of pixel value ranges according to interpretation targets.
Figure 2:
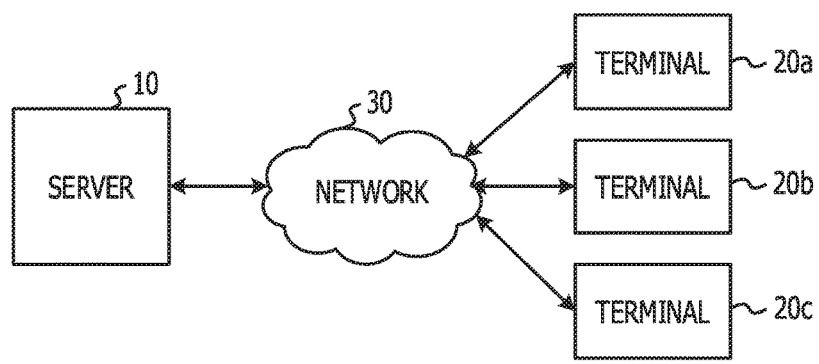
FIG. 2 is a diagram illustrating an example of a system according to a first embodiment.

FIG. 2 is a diagram illustrating an example of a system according to a first embodiment. The system according to the first embodiment is a system including a server 10, a terminals 20a, 20b, and 20c, and a network 30. The server 10 stores a medical image. When each of the terminals 20a, 20b, and 20c specifies an interpretation target of the medical image stored in the server 10, lossless encoding or low compression ratio encoding is performed on pixel value data within a pixel value range defined by the interpretation target of the medical image, and high compression ratio encoding is performed on pixel value data outside the pixel value range defined by the interpretation target, and the pieces of data are transmitted to the terminal. The server 10, the terminal 20a, the terminal 20b, and the terminal 20c may have an identical hardware configuration. Hereinafter, the terminals may be referred to as a terminal 20 when a description is made simply using a terminal.

Figure 3:
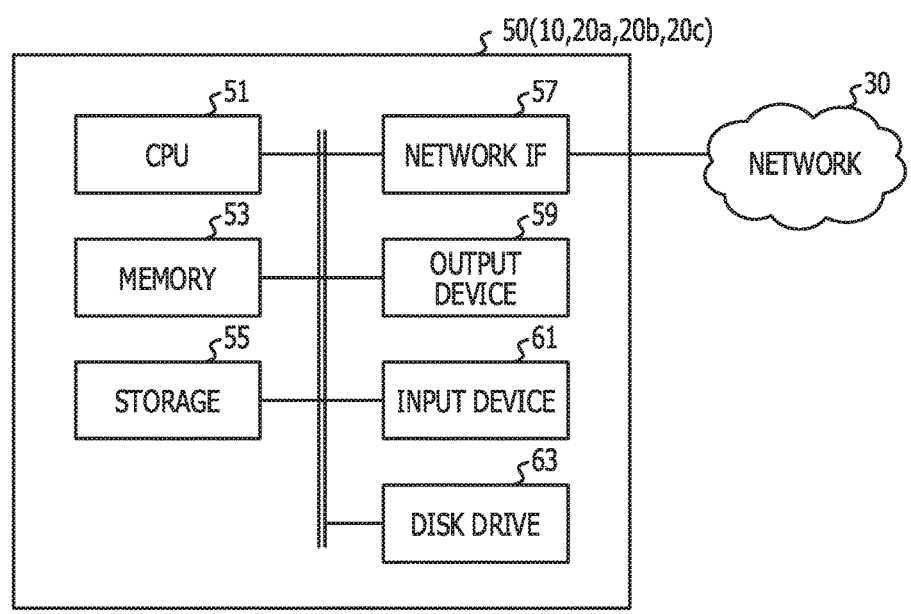
FIG. 3 is a diagram illustrating an example of hardware of an information processing device.

Each of the server 10, the terminal 20a, the terminal 20b, and the terminal 20c is an example of an information processing device, and includes, for example, hardware such as units of an information processing device 50 illustrated in FIG. 3. FIG. 3 is a diagram illustrating an example of hardware of the information processing device 50.

The information processing device 50 includes a central processing unit (CPU) 51, a memory 53, a storage 55, a network IF 57, an output device 59, an input device 61, and a disk drive 63, as hardware.

The CPU 51 is a processor that executes various pieces of processing specified by a program. A plurality of CPUs 51 may be included in the information processing device 50.

The memory 53 is a main storage device that temporarily stores data and a program that is to be executed by the CPU 51. The memory 53 may be a volatile memory or a non-volatile memory, and a plurality of memories 53 may be included in the information processing device 50.

The storage 55 is an auxiliary storage device that stores a program that is to be executed by the CPU 51 and data. A plurality of the storages 55 may be included in the information processing device 50.

The network IF 57 is an interface used for communication with another information processing device through a network. For example, the network IF 57 is a wired LAN interface or a wireless LAN interface.

The information processing device 50 may include the output device 59, the input device 61, and the disk drive 63. The output device 59 is, for example, a display or a printer. The input device 61 includes, for example, a keyboard and a mouse. The disk drive 63 is, for example, an optical drive or a magnetic drive.

Figure 4:
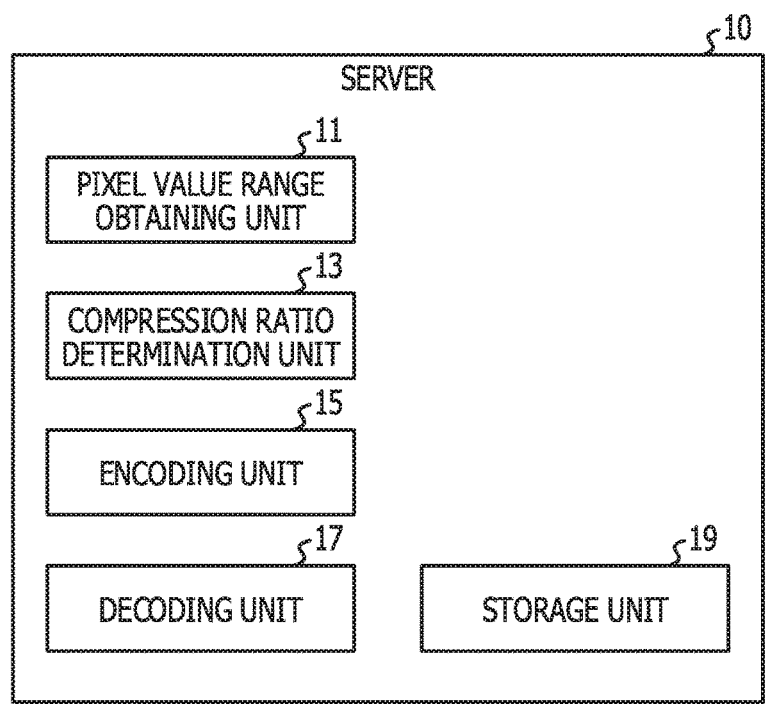
FIG. 4 is a diagram illustrating an example of a configuration of a server according to the first embodiment.

FIG. 4 is a diagram illustrating an example of a configuration of the server 10 according to the first embodiment. The server 10 includes a pixel value range obtaining unit 11, a compression ratio determination unit 13, an encoding unit 15, a decoding unit 17, and a storage unit 19. The pixel value range obtaining unit 11 obtains a pixel value range defined by an interpretation target specified by the terminal. The server 10 may receive a value that has been transmitted from the terminal 20 to obtain a pixel value range defined by the interpretation target after the terminal 20 has calculated the pixel value range to transmit the value to the server 10, or may calculate and obtain a pixel value range from received information indicating the interpretation target after the terminal 20 has transmitted the information indicating the interpretation target to the server 10.

The compression ratio determination unit 13 determines a compression ratio of an image that is to be encoded by the server 10 in a unit of a block. The block is a unit of encoding processing. The image is divided into blocks each having certain pixels, and encoded in the unit of the block. For example, in JPEG, the image is divided into a plurality of blocks each having "8×8 pixels" and encoded in the unit of the block, and in MPEG-2, a video is divided into a plurality of blocks each having "16×16 pixels" and encoded in the unit of the block.

The encoding unit 15 encodes the image in accordance with the compression ratio that has been determined by the compression ratio determination unit 13. The detail of the encoding unit 15 is described later. The decoding unit 17 decodes the information that has been encoded by the encoding unit 15.

The storage unit 19 stores the information that has been decoded by the decoding unit 17.

The pixel value range obtaining unit 11, the compression ratio determination unit 13, the encoding unit 15, and the decoding unit 17 may be obtained by dedicated hardware, or may be achieved when the CPU 51 executes a program. The storage unit 19 may be obtained by the memory 53, the storage 55, or another storage unit.

Figure 5:
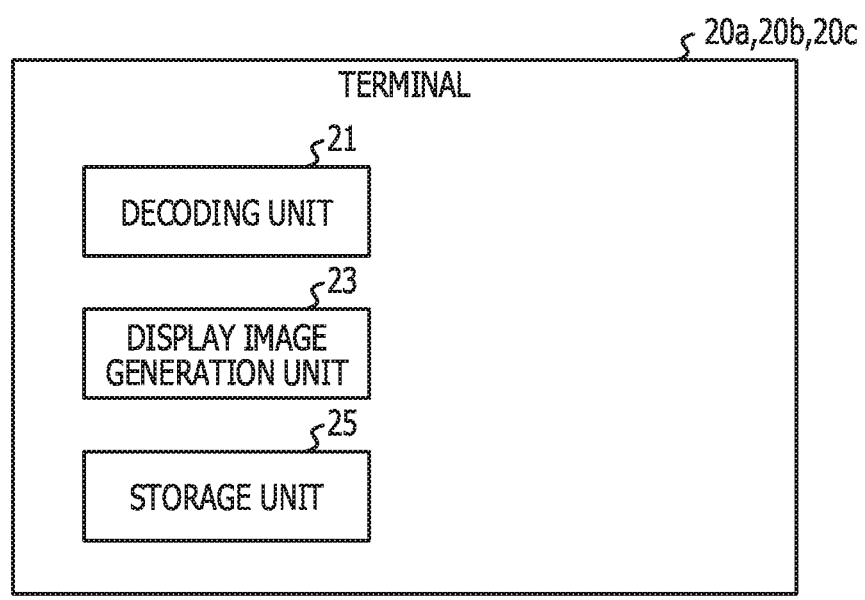
FIG. 5 is a diagram illustrating an example of a configuration of a terminal according to the first embodiment.

FIG. 5 is a diagram illustrating an example of a configuration of the terminal 20 according to the first embodiment. The terminal 20 includes a decoding unit 21, a display image generation unit 23, and a storage unit 25. The decoding unit 21 decodes the information that has been encoded by the encoding unit 15 of the server 10.

The display image generation unit 23 generates a display image in accordance with the information that has been decoded by the decoding unit 21. The storage unit 25 stores the display image that has been generated by the display image generation unit 23.

The decoding unit 21 and the display image generation unit 23 may be obtained by dedicated hardware, or may be achieved when the CPU 51 executes a program. The storage unit 25 may be obtained by the memory 53, the storage 55, or another storage unit. The operation in which the display image is generated, which is executed in the terminal 20, is described later with reference to FIGS. 13 and 14.

Figure 6:
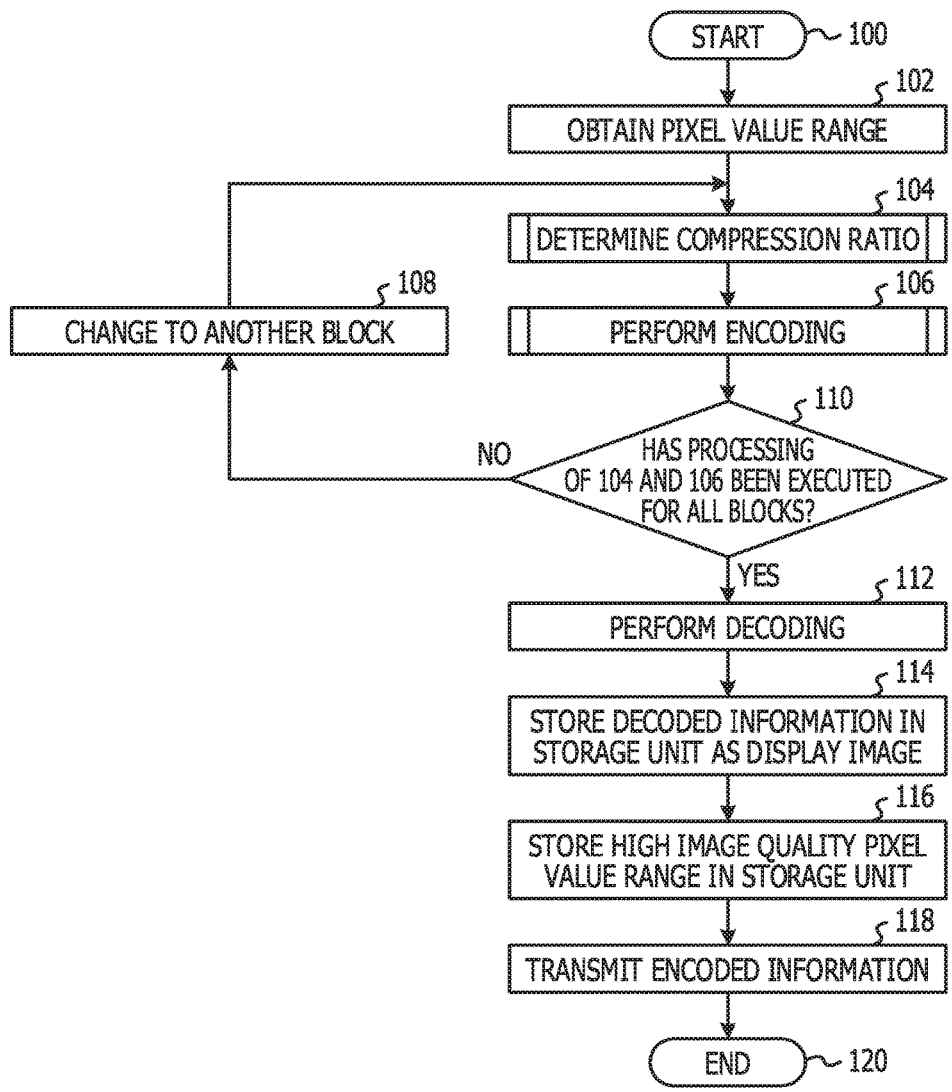
FIG. 6 is a flowchart illustrating a procedure example in which an image is encoded in the first embodiment.

The operation in which the image is encoded in the server 10 is described below with reference to FIG. 6. FIG. 6 is a flowchart illustrating a procedure example in which the image is encoded in the first embodiment.

The processing starts when the terminal 20 specifies an interpretation target (100). When the server 10 receives information indicating the interpretation target from the terminal 20, the server 10 calculates and obtains a pixel value range defined by the interpretation target (102). The range of an X-ray absorption coefficient is different depending on a living tissue such as water, an adipose tissue, a soft tissue, or a bone, and the range of an X-ray absorption coefficient corresponding to each interpretation target is defined by the proportion of the living tissues such as water, an adipose tissue, a soft tissue, and a bone that constitute brain, heart, lung or the like that is the interpretation target of the medical image, so that a pixel value range corresponding to the interpretation target is defined based on the defined range of the X-ray absorption coefficient. The server 10 may obtain a pixel value range by receiving information on the pixel value range defined by the interpretation target, which has been calculated by the terminal 20. Next, the server 10 selects a single block from among a plurality of blocks to determine a compression ratio in a unit of a block (104). The detail is described with reference to FIG. 7.

Figure 7:
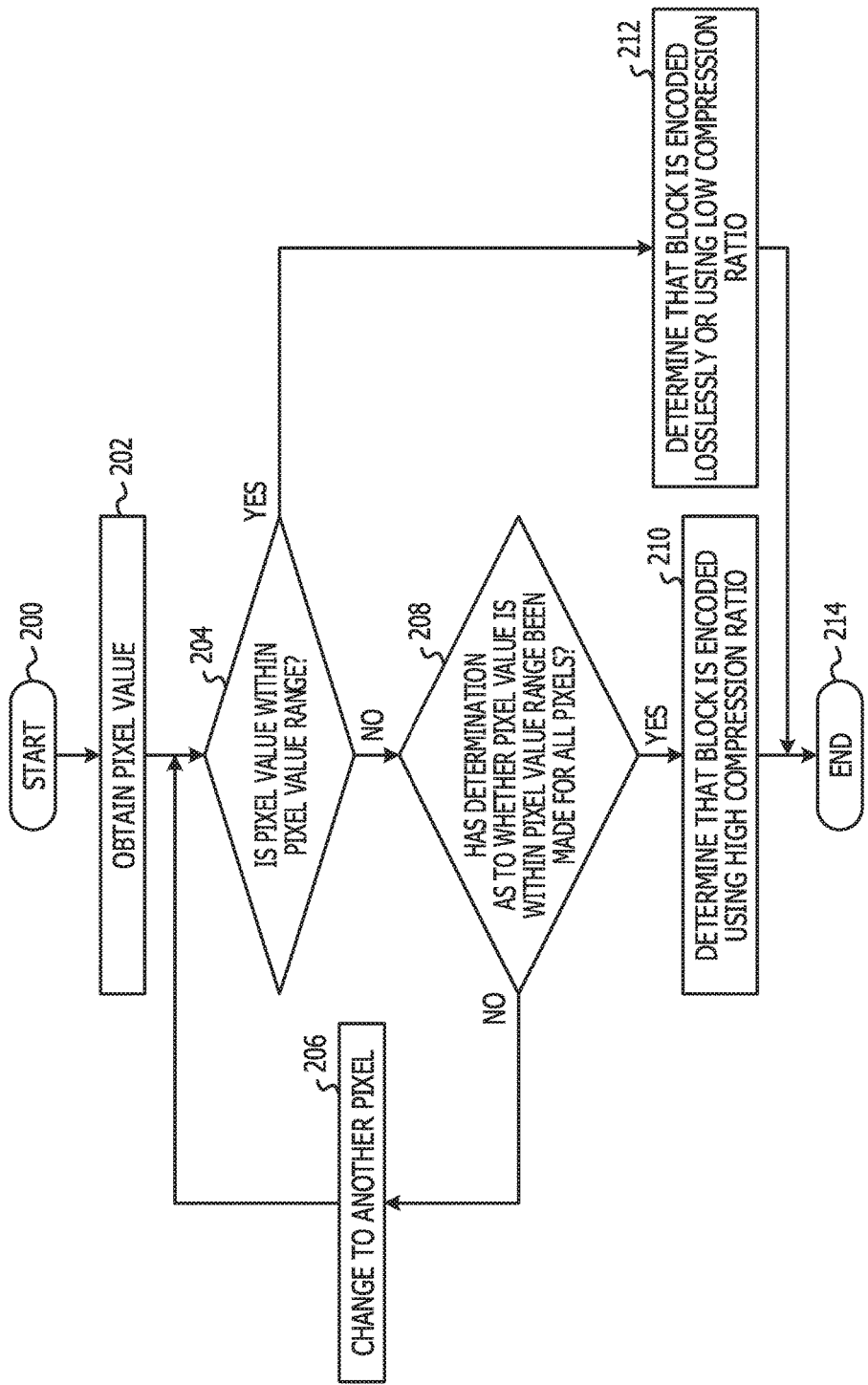
FIG. 7 is a flowchart illustrating a procedure example in which a compression ratio is determined in the first embodiment.

FIG. 7 is a flowchart illustrating a procedure example in which a compression ratio is determined in the first embodiment. The processing starts when the pixel value range is obtained (200). The compression ratio determination unit 13 obtains pixel values of pixels that constitute the block (202). The pixel values may be stored in the storage unit 19 in advance and obtained from the storage unit 19.

Next, the pixel value of a single pixel is selected from among the pixel values of the pixels that constitute the obtained block, and whether the selected pixel value is within the pixel value range is determined (204). When the pixel value is within the pixel value range (Yes in 204), it is determined that lossless encoding or low compression ratio encoding is performed on the block (212). For example, when the pixel value range is 100 to 150, and the pixel value is 110, it is determined that the pixel value is within the pixel value range, and that lossless encoding or low compression ratio encoding is performed on the block including the pixel. After that, and the processing ends (214).

The lossless encoding is encoding that is performed without loss so that information before the encoding becomes completely the same as information after decoding, and so-called encoding in a reversible encoding scheme. It is only sufficient that the low compression ratio is a compression ratio with which encoding is performed using data a part of which is missing and that is enough to avoid misdiagnosis when decoding is performed in the terminal 20, and the low compression ratio is not limited to a certain compression ratio. Any low compression ratio is to be employed depending on an interpretation target and a diagnosis content. For example, when interpretation is performed for diagnosis of a focus that has a serious effect on life such as cancer, it is desirable that a compression ratio by which missing data is reduced as much as possible is employed when encoded information is decoded.

Returning to the processing of 204, when the pixel value is not within the pixel value range (No in 204), it is determined whether processing in which whether the pixel value is within the pixel value range is determined has been executed for all of the pixels in the block (208). For example, when encoding is performed by the JPEG scheme, whether "8×8" pixels that constitute the block are within the pixel value range is determined.

When it is determined that the processing in which whether the pixel value is within the pixel value range is determined has been executed for all of the pixels in the block (Yes in 208), it is determined that the block is encoded with using a high compression ratio (210), and the processing ends (214). The high compression ratio has a higher compression ratio than the low compression ratio. When it is determined that the processing in which whether the pixel value is within the pixel value range is determined has been executed for not all of the pixels in the block (No in 208), the target is changed to another pixel in the block, for which whether the pixel value is within the pixel value range is yet to be determined (206), and the processing staring from 204 is repeated.

Returning to FIG. 6, after the compression ratio has been determined, the server encodes the block for which the compression ratio has been determined (106). The detail of the encoding is described below with reference to FIG. 8.

Figure 8:
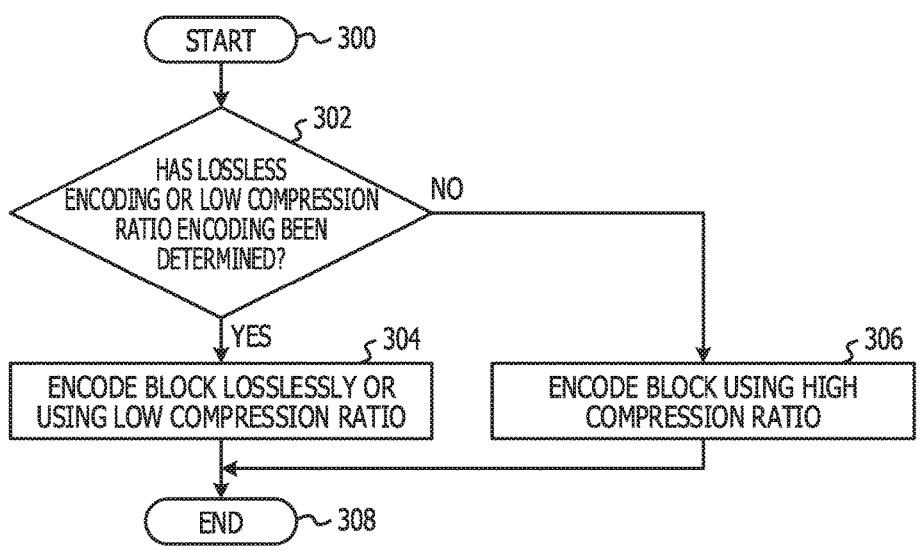
FIG. 8 is a flowchart illustrating a procedure example in which encoding is performed in the first embodiment.

FIG. 8 is a flowchart illustrating a procedure example in which the encoding is performed in the first embodiment. The processing starts when the compression ratio determination unit 13 has determined the compression ratio by the procedure example illustrated in FIG. 7 (300). When it has been determined that the lossless encoding or the low compression ratio encoding is performed on the block (Yes in 302), the lossless encoding or the low compression ratio encoding is performed on the block (304), and the processing ends (308).

When it has not been determined that the lossless encoding or the low compression ratio encoding is performed on the block, that is, when it has been determined that the high compression ratio encoding is performed on the block (No in 302), the high compression ratio encoding is performed on the block (306), and the processing ends (308).

Returning to FIG. 6, after the encoding of the block for which the compression ratio has been determined, whether the processing of 104 and 106 has been executed for all of the blocks is determined (110). When the processing of 104 and 106 has been executed for not all of the blocks (No in 110), the target is changed to another block for which the processing of 104 and 106 is yet to be executed (108), and the processing starting from 104 is repeated. When the processing of 104 and 106 has been executed for all of the blocks (Yes in 110), the encoded information on each of the blocks is decoded (112), and the decoded information is stored in the storage unit 19 as a display image (114).

Next, the pixel value range that has been obtained in 102 is stored in the storage unit 19 as a high image quality pixel value range (116). FIG. 15 is a diagram illustrating an example of the high image quality pixel value range. For example, the pixel value range that has been obtained in 102 is 100 to 150, information illustrated in FIG. 15 is stored in the storage unit 19. Next, the encoded information is transmitted to the terminal 20 (118), and the processing ends (120).

Figure 9:
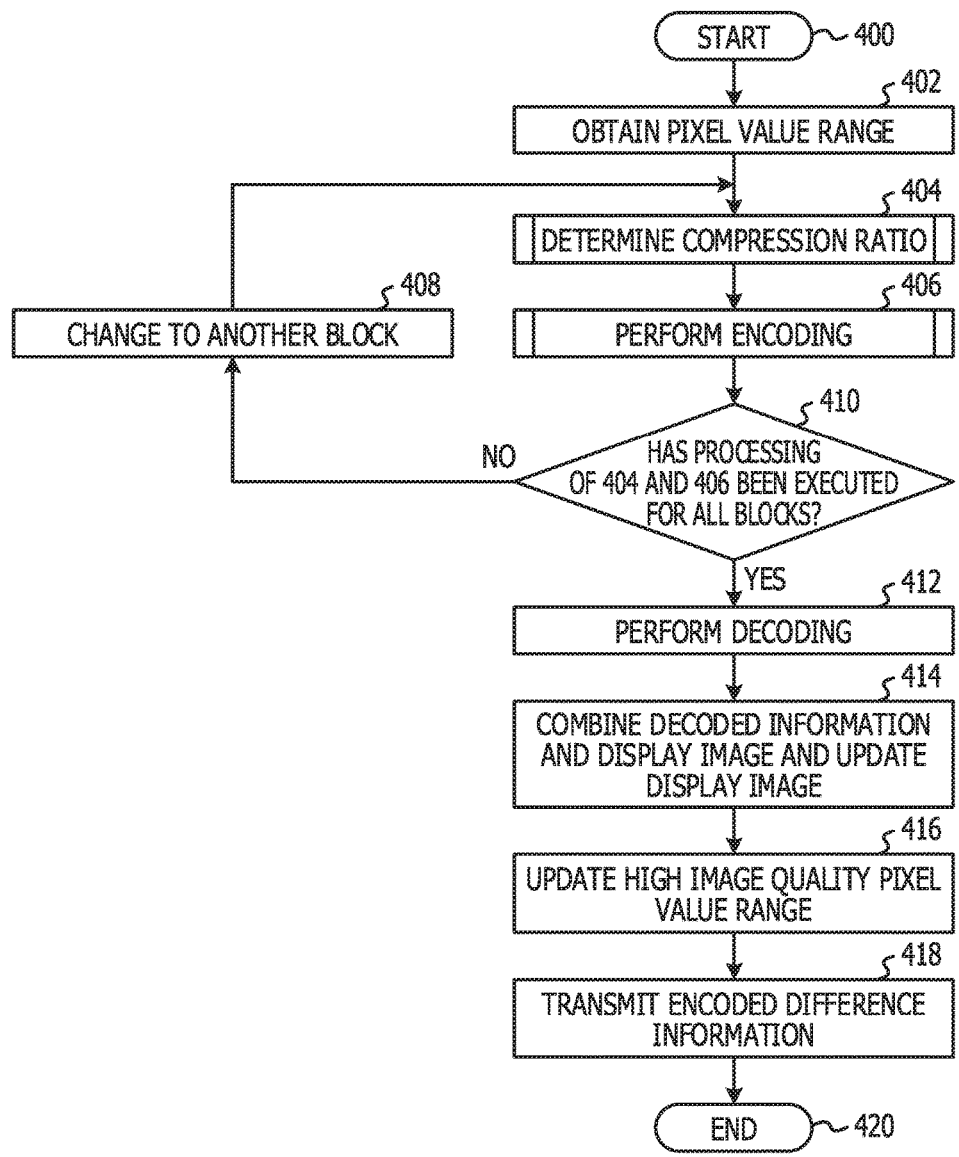
FIG. 9 is a flowchart illustrating a procedure example in which an image at the time of interpretation target change is encoded in the first embodiment.

An operation in which an image at the time of interpretation target change is encoded is described below with reference to FIG. 9. FIG. 9 is a flowchart illustrating a procedure example in which an image at the time of interpretation target change is encoded in the first embodiment.

The processing starts when the terminal 20 specifies the changed interpretation target (400). When the server 10 receives information indicating the interpretation target from the terminal 20, the server 10 calculates and obtains a pixel value range defined by the interpretation target (402). The range of an X-ray absorption coefficient is different depending on a living tissue such as water, an adipose tissue, a soft tissue, or a bone, and the range of an X-ray absorption coefficient corresponding to each interpretation target is defined by the proportion of the living tissues such as water, an adipose tissue, a soft tissue, and a bone that constitute brain, heart, lung or the like that is the interpretation target of the medical image, so that a pixel value range corresponding to the interpretation target is defined based on the defined range of the X-ray absorption coefficient. The server 10 may obtain a pixel value range by receiving information on the pixel value range defined by the interpretation target, which has been calculated by the terminal 20.

Next, the server 10 selects a single block from among a plurality of blocks to determine a compression ratio of the image in a unit of a block (404). The detail is described below with reference to FIG. 10.

FIG. 10 is a flowchart illustrating a procedure example in which a compression ratio at the time of interpretation target change is determined in the first embodiment. The processing starts when the pixel value range is obtained (500). The compression ratio determination unit 13 obtains the pixel values of pixels that constitute the block (502). The pixel values may be stored in the storage unit 19 in advance and obtained from the storage unit 19.

Next, the pixel value of a single pixel is selected from among the pixel values of the pixels that constitute the obtained block, and whether the selected pixel value is a value within the pixel value range is determined (504). When the pixel value is within the pixel value range (Yes in 504), whether the pixel value is within a high image quality pixel value range is determined (508). When the pixel value is not within the high image quality pixel value range (No in 508), difference information is obtained from the medical image and the display image (510).

For example, when the high image quality pixel value range is 200 to 220, and the pixel value is 210, it is determined that the pixel value is within the high image quality pixel value range. When the high image quality pixel value range is 100 to 150, and the pixel value is 210, it is determined that the pixel value is not within the high image quality pixel value range, and difference information is obtained by respectively subtracting the pixel values of the pixels included in the block that is the target of the encoding processing in the display image from the pixel values of the corresponding pixels included in the block that is the target of the encoding processing in the medical image.

FIG. 11 is a diagram illustrating an example in which difference information is obtained from the pixel values of the pixels included in the block that is the target of the encoding processing in the medical image and the pixel values of the corresponding pixels included in the block that is the target of the encoding processing in the display image. As illustrated in FIG. 11, the difference information (C) is obtained by respectively subtracting the pixel values of the pixels included in the block that is the target of the encoding processing in the medical image from the pixel values of the corresponding pixels included in the block that is the target of the encoding processing in the display image ((A)-(B)). Next, the compression ratio determination unit 13 determines that lossless encoding or the low compression ratio encoding is performed on the obtained difference information (512).

Returning to the processing of 508, when the pixel value is within the high image quality pixel value range (Yes in 508), the flow proceeds to the processing of 506. In the processing of 506, it is determined whether processing in which whether the pixel value is within the pixel value range is determined has been executed for all of the pixels in the block (506). When it is determined that the processing in which whether the pixel value is within the pixel value range is determined has been executed for all of the pixels in the block (Yes in 506), and the processing ends (516). When it is determined that the processing in which whether the pixel value is within the pixel value range is determined has been executed for not all of the pixels in the block (No in 506), the target is changed to another pixel for which whether the pixel value is within the pixel value range is yet to be determined (514), and the processing starting from 504 is repeated.

Returning to FIG. 9, after the compression ratio has been determined, the server 10 encodes the block for which the compression ratio has been determined (406). The detail of the encoding is described below with reference to FIG. 12.

Figure 12:
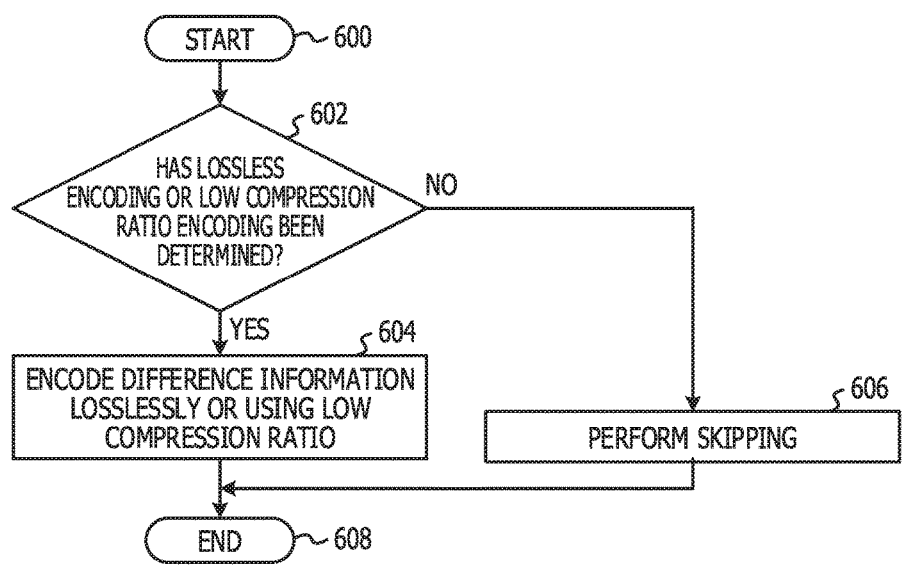
FIG. 12 is a flowchart illustrating a procedure example in which encoding is performed at the time of interpretation target change in the first embodiment.

FIG. 12 is a flowchart illustrating a procedure example in which the encoding is performed at the time of interpretation target change in the first embodiment. The processing starts after the compression ratio determination unit 13 has determined the compression ratio by the above-described procedure example illustrated in FIG. 9 (600). When it has been determined that the lossless encoding or the low compression ratio encoding is performed on the block (Yes in 602), the lossless encoding or the low compression ratio encoding is performed on the block (604), and the processing ends (608). When it has not been determined that the lossless encoding or the low compression ratio encoding is performed on the block (No in 602), it is determined that the encoding processing is skipped (606), and the processing ends (608).

Returning to FIG. 9, after the encoding has been performed, whether the processing of 404 and 406 has been executed for all of the blocks is determined (410). When the processing of 404 and 406 has been executed for not all of the blocks (No in 410), the target is changed to another block for which the processing of 404 and 406 is yet to be executed (408), and the processing starting from 404 is repeated.

When the processing of 404 and 406 has been executed for all of the blocks (Yes in 410), the encoded difference information of each of the blocks is decoded (412), and the decoded information and the display image stored in the storage unit 19 are combined, and the display image is updated and stored in the storage unit 19 (414). For example, information that has been obtained by combining the pixel value obtained from the decoded information and the pixel value obtained from the display image is updated as the display image.

Next, the pixel value range that has been obtained in 402 is compared with the high image quality pixel value range stored in the storage unit 19, and when the obtained pixel value range is not within the high image quality pixel value range, the high image quality pixel value range is updated (416).

For example, when the high image quality pixel value range is 100 to 150, and the obtained pixel value range is 120 to 160, the range 151 to 160 in the obtained pixel value range is not within the high image quality pixel value range, so that the high image quality pixel value range is updated to 100 to 160. In addition, when the high image quality pixel value range is 100 to 150, and the obtained pixel value range is 200 to 220, the obtained pixel value range 200 to 220 is not within the high image quality pixel value range, so that the high image quality pixel value range is updated to the pixel value ranges 100 to 150 and 200 to 220. In addition, when the high image quality pixel value range is 100 to 150, and the obtained pixel value range is 110 to 120, the obtained pixel value range 110 to 120 is within the high image quality pixel value range, so that the high image quality pixel value range is not updated.

FIG. 16 is a diagram illustrating the pixel value range stored in the high image quality pixel value range when the high image quality pixel value range is 100 to 150, and the obtained pixel value range is 200 to 220. The obtained pixel value range 200 to 220 is not within the high image quality pixel value range, so that the pixel value ranges 100 to 150 and 200 to 220 are stored in the high image quality pixel value ranges.

Returning to FIG. 9, when the high image quality pixel value range is updated, the encoded difference information is transmitted to the terminal 20 (418), and the processing ends (420).

In addition, when the interpretation target is changed, it is sufficient to execute the processing of the procedure example illustrated in FIG. 9 each time the interpretation target is changed.

Figure 13:
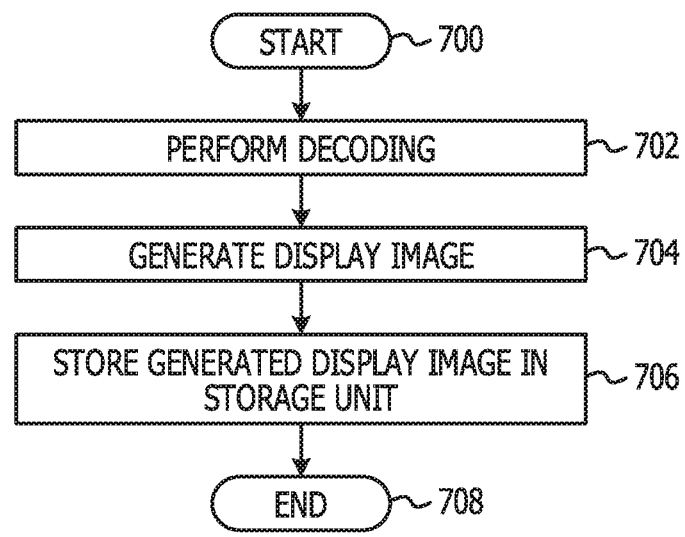
FIG. 13 is a flowchart illustrating a procedure example in which an image is decoded in the first embodiment.

An operation in which the image is decoded in the terminal 20 is described below with reference to FIG. 13. FIG. 13 is a flowchart illustrating a procedure example in which the image is decoded in the first embodiment.

The processing starts when the encoded information has been received from the server 10 (700). The terminal 20 decodes the encoded information in the unit of the block (702). Next, the terminal 20 generates a display image from the decoded information (704). Next, the terminal 20 stores the generated display image in the storage unit 25 (706), and the processing ends (708).

Figure 14:
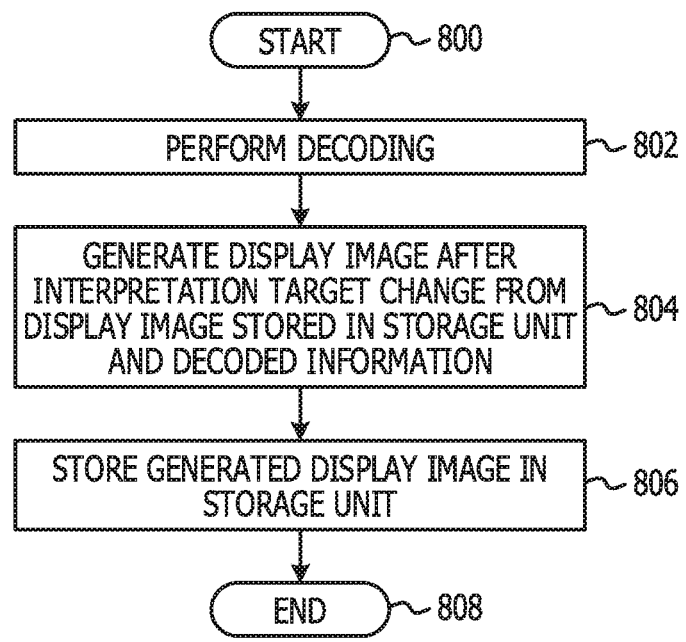
FIG. 14 is a flowchart illustrating a procedure example in which an image at the time of interpretation target change is decoded in the first embodiment.

An operation in which the image in the terminal 20 at the time of interpretation target change is decoded is described below with reference to FIG. 14. FIG. 14 is a flowchart illustrating a procedure example in which the image at the time of interpretation target change is decoded in the first embodiment.

The processing starts when the encoded difference information has been received from the server 10 (800). The terminal 20 decodes the encoded difference information in the unit of the block (802). Next, the terminal 20 combines the display image stored in the storage unit 25 in the processing of 706 and the decoded information to generates a display image after the interpretation target change (804).

Here, the display image stored in the storage unit 25, that is, the display image before the interpretation target change and the decoded different information are combined to generate the display image after the interpretation target change because the difference information transmitted from the server 10 is information of a difference between the display image before the interpretation target change and the image for which the lossless encoding or the low compression ratio encoding has been desired to be performed due to the interpretation target change.

Next, the terminal 20 stores the generated display image in the storage unit 25 (806), and the processing ends (808).

In the information processing device according to the first embodiment, in a case in which the interpretation target is changed, when a block on which the lossless encoding or the low compression ratio encoding is yet to be performed is obtained, and the lossless encoding or the low compression ratio encoding is performed merely on the obtained block, so that an amount of data transmitted to the terminal may be reduced.

In addition, in the case in which the interpretation target is changed, an amount of data transmitted to the terminal may be reduced not by encoding the medical image as is but by generating difference information from the medical image and the display image and merely transmitting the difference information to the terminal.

Second Embodiment

A second embodiment of the technology discussed herein is described below. The second embodiment is different from the first embodiment in that difference information is encoded using two or more types of compression ratios.

Figure 17:
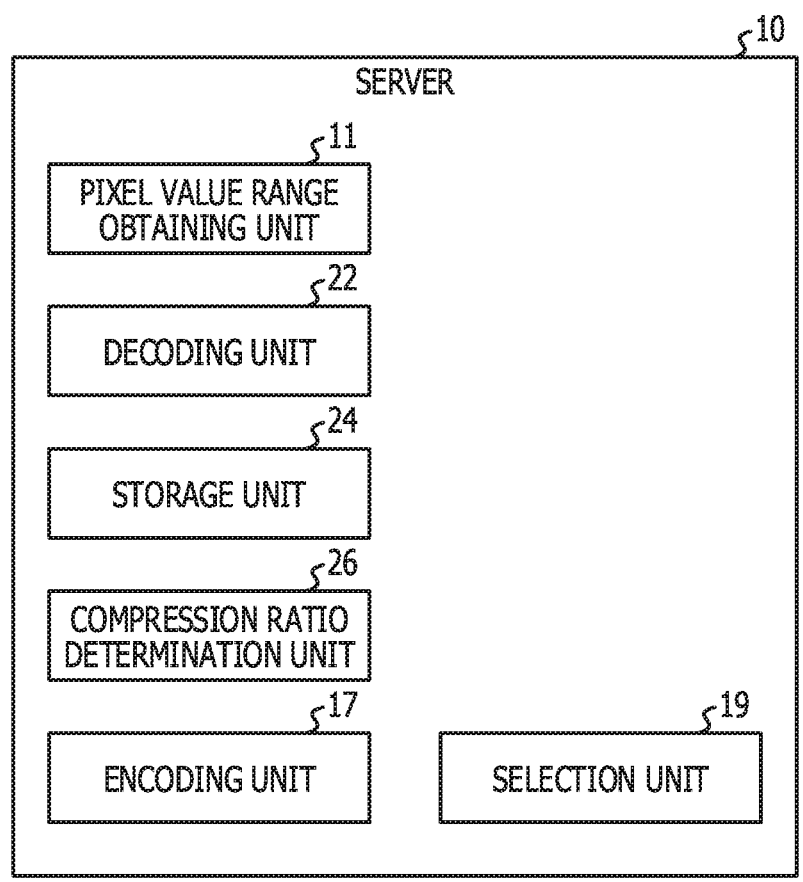
FIG. 17 is a diagram illustrating an example of a configuration of a server according to a second embodiment.

FIG. 17 is a diagram illustrating an example of a configuration of the server 10 according to the second embodiment. A compression ratio decision unit 22 determines a compression ratio of an image that is to be encoded by the server 10, in a unit of a block. The compression ratio decision unit 22 is different from the compression ratio determination unit 13 according to the first embodiment in that difference information is encoded using a low compression ratios 1 and 2 at the time of interpretation target change.

An encoding unit 24 encodes the image in accordance with the compression ratios that have been determined by the compression ratio decision unit 22. The encoding unit 24 is different from the encoding unit 15 according to the first embodiment in that the difference information is encoded using different compression ratios such as the low compression ratios 1 and 2.

A selection unit 26 selects one of the pieces of information that have been encoded using the low compression ratios 1 and 2 by the encoding unit 24. Unless otherwise specified, functions of the other configurations are similar to those of the first embodiment.

Figure 18:
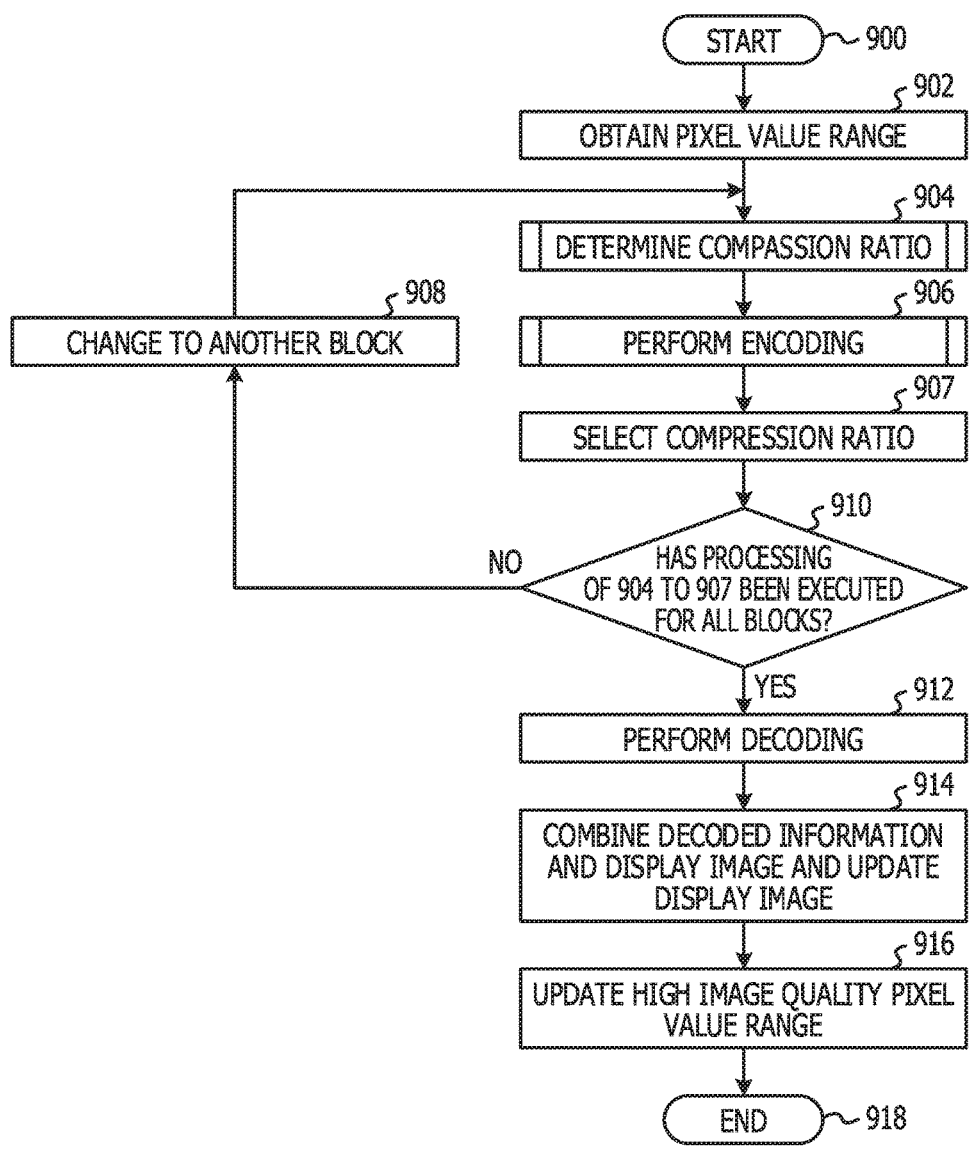
FIG. 18 is a flowchart illustrating a procedure example in which an image at the time of interpretation target change is encoded in the second embodiment.

An operation in which the image at the time of interpretation target change is encoded in the second embodiment is described below with reference to FIG. 18. An operation in which the image before the interpretation target change is encoded may be similar to that of the first embodiment, so that the description is omitted herein. FIG. 18 is a flowchart illustrating a procedure example in which the image at the time of interpretation target change is encoded in the second embodiment.

The processing starts when the terminal 20 specifies the changed interpretation target (900). When the server 10 receives information indicating the interpretation target from the terminal 20, the server 10 calculates and obtains a pixel value range defined by the interpretation target (902). The range of an X-ray absorption coefficient is different depending on a living tissue such as water, an adipose tissue, a soft tissue, or a bone, and the range of an X-ray absorption coefficient corresponding to each interpretation target is defined by the proportion of the living tissues such as water, an adipose tissue, a soft tissue, and a bone that constitute brain, heart, lung or the like that is the interpretation target of the medical image, so that a pixel value range corresponding to the interpretation target is defined based on the defined range of the X-ray absorption coefficient. The server 10 may obtain a pixel value range by receiving information on the pixel value range defined by the interpretation target, which has been calculated by the terminal 20.

Next, the server 10 determines a compression ratio of the image (904). The detail is described below with reference to FIG. 19.

Figure 19:
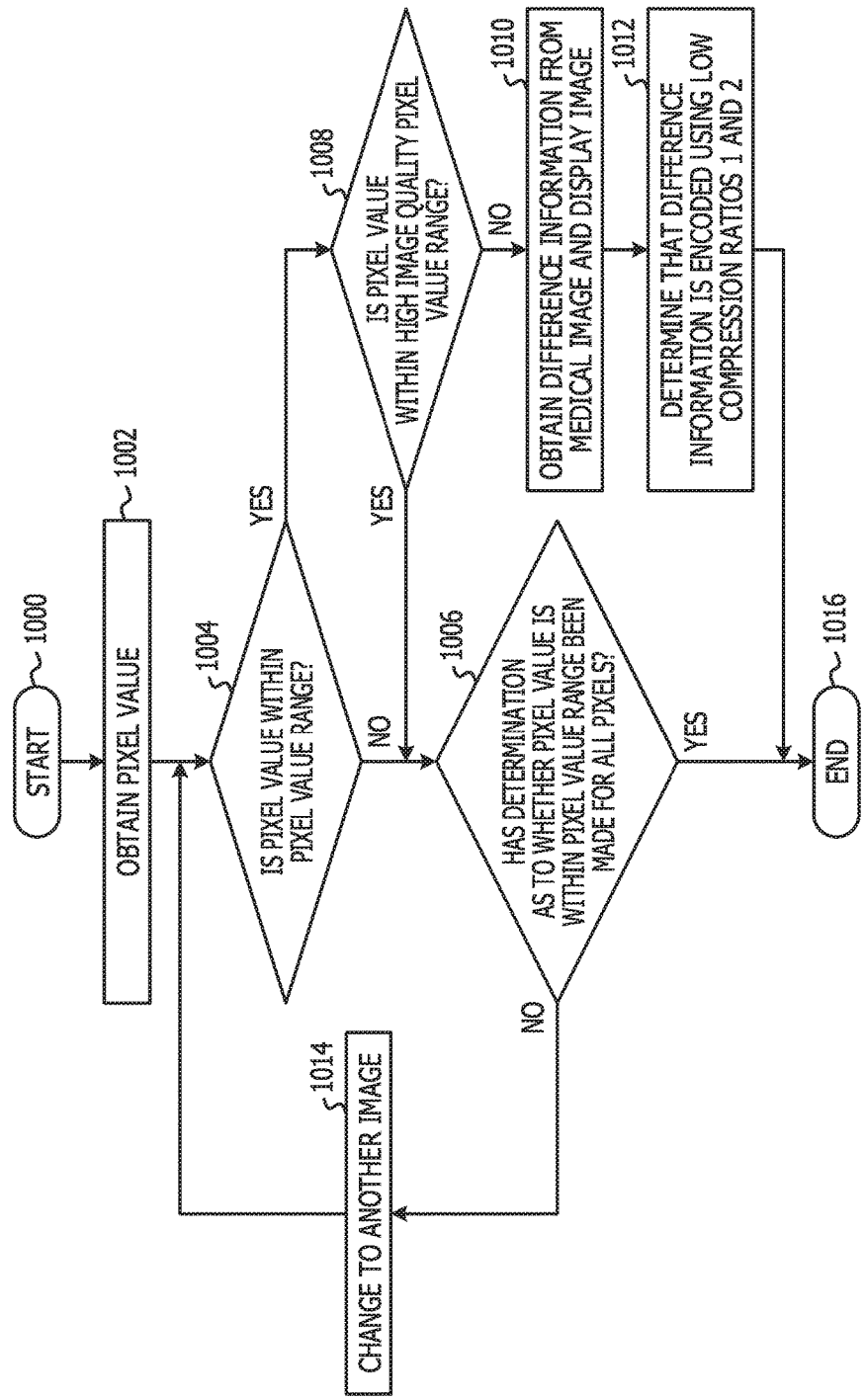
FIG. 19 is a flowchart illustrating a procedure example in which a compression ratio at the time of interpretation target change is determined in the second embodiment.

FIG. 19 is a flowchart illustrating a procedure example in which the compression ratio at the time of interpretation target change is determined in the second embodiment. The processing starts when the pixel value range is obtained (1000). The compression ratio decision unit 22 obtains the pixel values of pixels that constitute a block (1002). The pixel values may be stored in the storage unit 19 in advance, and obtained from the storage unit 19.

Next, the pixel value of a single pixel is selected from among the pixel values of the pixels that constitute the obtained block, and whether the selected pixel value is within the pixel value range is determined (1004). When the pixel value is within the pixel value range (Yes in 1004), whether the pixel value is within a high image quality pixel value range is determined (1008).

When the pixel value is not within the high image quality pixel value range (No in 1008), difference information is obtained from the medical image and the display image (1010). For example, the difference information is obtained by respectively subtracting the pixel values of the pixels included in the block that is the target of the encoding processing in the display image from the pixel values of the corresponding pixels included in the block that is the target of the encoding processing in the medical image. Next, the compression ratio decision unit 22 determines that the obtained difference information is encoded using the low compression ratios 1 and 2 (1012).

Returning to the processing of 1008, when the pixel value is within the high image quality pixel value range (Yes in 1008), the flow proceeds to the processing of 1006. In the processing of 1006, it is determined whether processing in which whether the pixel value is within the pixel value range is determined has been executed for all of the pixels in the block (1006). When the processing in which whether the pixel value is within the pixel value range is determined has been executed for all of the pixels in the block (Yes in 1006), and the processing ends (1016). When the processing in which whether the pixel value is within the pixel value range is determined has been executed for not all of the pixels in the block (No in 1006), the target is changed to another pixel for which whether the pixel value is within the pixel value range is yet to be determined (1014), and the processing starting from 1004 is repeated.

Returning to FIG. 18, after the compression ratio of the image has been determined, the server 10 encodes the block for which the compression ratio has been determined (906). The detail of the encoding is described below with reference to FIG. 20.

Figure 20:
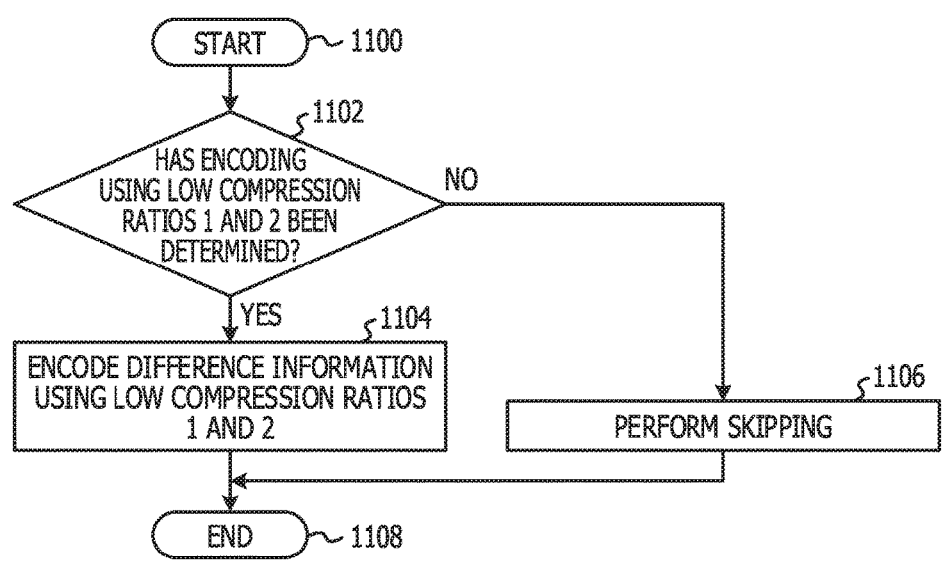
FIG. 20 is a flowchart illustrating a procedure example in which encoding is performed at the time of interpretation target change in the second embodiment.

FIG. 20 is a flowchart illustrating a procedure example in which the encoding is performed at the time of interpretation target change in the second embodiment. The processing starts after the compression ratio decision unit 22 has determined the compression ratio by the above-described procedure example illustrated in FIG. 19 (1100). When it has been determined that the block is encoded using the low compression ratios 1 and 2 (Yes in 1102), the block is encoded using the low compression ratios 1 and 2 (1104), and the processing ends (1108).

It is assumed that each of the low compression ratios 1 and 2 is a compression ratio with which the encoding is performed using data a part of which is missing but that is enough to avoid misdiagnosis when decoding is performed in the terminal 20. For example, the low compression ratio 1 may be a compression ratio similar to that of the lossless encoding, and the low compression ratio 2 may be a compression ratio similar to the low compression ratio in the first embodiment. In addition, the low compression ratios 1 and 2 may be a compression ratio different from the low compression ratio in the first embodiment.

When it is not determined that the block is encoded using the low compression ratios 1 and 2 (No in 1102), it is determined that the encoding processing is skipped (1106), and the processing ends (1108).

Returning to FIG. 18, after the encoding has been performed, information that has been encoded using one of the low compression ratios 1 and 2 is selected (907). For example, from among the pieces of information that has been encoded using the low compression ratios 1 and 2, information having a good encoding efficiency is selected. Pieces of information that have been obtained by encoding all of the blocks using one of the low compression ratios 1 and 2 may be selected and used, or pieces of information that have been obtained by respectively encoding the blocks using different compression ratios such as the low compression ratios 1 and 2 may be selected and used.

Next, it is determined whether the processing of 904 to 907 has been executed, for all of the blocks (910). When the processing of 904 to 907 has been executed for not all of the blocks (No in 910), the target is changed to another block for which the processing of 904 to 907 is yet to be executed (908), and the processing starting from 904 is repeated.

When the processing of 904 to 907 has been executed for all of the blocks (Yes in 910), the encoded difference information of each of the blocks is decoded (912), and the decoded information and the display image stored in the storage unit 19 are combined, and the display image is updated and stored in the storage unit 19 (914). For example, information that has been obtained by combining the pixel values obtained from the decoded information and the pixel values obtained from the display image is updated as a display image.

Next, the pixel value range that has been obtained in 902 is compared with the high image quality pixel value range stored in the storage unit 19, and when the obtained pixel value range is not within the high image quality pixel value range, the high image quality pixel value range is updated (916). After the high image quality pixel value range has been updated, the processing ends (918). The example is described above in which the two types of compression ratios such as the low compression ratios 1 and 2 are used, but three or more types of compression ratios may be used.

An operation in which decoding is performed in the terminal 20 may be similar to that of the first embodiment, so that the description is omitted herein.

As described above, in the information processing device according to the second embodiment, when the encoding is performed using the low compression ratio, information that has been coded using an encoding-efficient and suitable compression ratio may be selected from information that has been encoded not by a single type of a compression ratio, but by two or more types of compression ratios in the unit of the block, and the information may be transmitted to the terminal, so that an amount of data transmitted to the terminal may be reduced.

Third Embodiment

A third embodiment of the technology discussed herein is described below. The third embodiment is different from the first embodiment in that the server 10 generates difference information from information that has been obtained by encoding a medical image using a low compression ratio at the time of interpretation target change. Unless otherwise specified, functions of the other configurations in the third embodiment are similar to those of the first embodiment.

Figure 21:
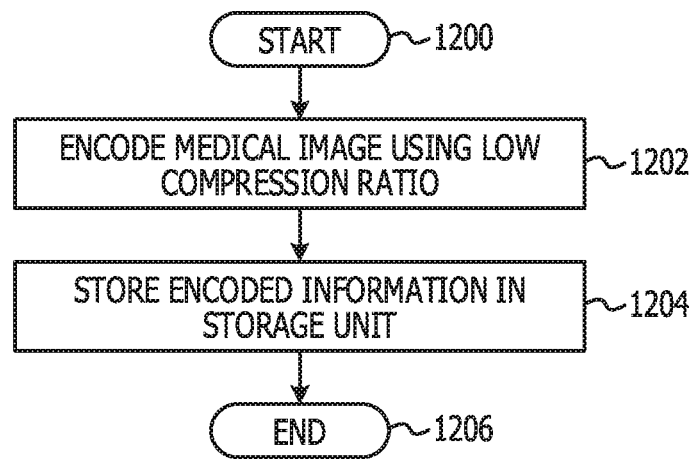
FIG. 21 is a flowchart illustrating a procedure example in which a medical image is encoded and stored in a storage unit in a third embodiment.

FIG. 21 is a flowchart illustrating a procedure example in which a medical image is encoded and stored in a storage unit in the third embodiment. The processing starts after the server 10 has obtained the medical image, and at least before the terminal 20 specifies the changed interpretation target (1200). The server 10 encodes the medical image using a low compression ratio (1202). The low compression ratio is a compression ratio with which the encoding is performed using data a part of which is missing and that is enough to avoid misdiagnosis when decoding is performed in the terminal 20. Next, the server 10 stores the encoded information in the storage unit (1204), and the processing ends (1206).

FIG. 22 is a flowchart illustrating a procedure example in which a compression ratio at the time of interpretation target change is determined in the third embodiment. The processing starts when the pixel value range is obtained (1300). The compression ratio determination unit 13 obtains the pixel values from pixels of the medical image that has been divided into units of blocks (1302). The pixel values may be stored in the storage unit 19 in advance and obtained from the storage unit 19.

Next, the pixel value of a single pixel is selected from among the pixel values of the pixels that constitute the obtained block, and it is determined whether the selected pixel value is within the pixel value range (1304). When the pixel value is within the pixel value range (Yes in 1304), it is determined whether the pixel value is within a high image quality pixel value range (1308). When the pixel value is not within the high image quality pixel value range (No in 1308), the encoded information stored in the storage unit is decoded (1309).

Next, difference information is obtained from the information that has been decoded in 1309 and the display image (1310). For example, the difference information is obtained by respectively subtracting the pixel values of the pixels included in the block that is the target of the encoding processing in the display image from the pixel values obtained from the information that has been decoded in 1309 and corresponds to the block. Next, the compression ratio determination unit 13 determines that lossless encoding or low compression ratio encoding is performed on the obtained difference information (1312).

Returning to the processing of 1308, when the pixel value is within a high image quality pixel value range (Yes in 1308), the flow proceeds to the processing of 1306. In the processing of 1306, it is determined whether processing in which whether the pixel value is within the pixel value range is determined has been executed for all of the pixels in the block (1306). When it is determined that the processing is whether the pixel value is within the pixel value range is determined has been executed for all of the pixels in the block (Yes in 1306), and the processing ends (1316). When it is determined that the processing is whether the pixel value is within the pixel value range is determined has been executed for not all of the pixels in the block (No in 1306), the interpretation target is changed to another pixel for which whether the pixel value is within the pixel value range is yet to be determined (1314), and the processing starting from 1304 is repeated.

An operation in which decoding is performed in the terminal 20 may be similar to that of the first embodiment, so that the description is omitted herein.

As described above, in the information processing device according to the third embodiment, the server 10 encodes the medical image using the low compression ratio and stores the medical image in the storage unit, and a block on which the lossless encoding or the low compression ratio encoding is yet to be performed is obtained at the time of interpretation target change, and the lossless encoding or the low compression ratio encoding is performed merely on the obtained block to reduce an amount of data transmitted to the terminal.

In addition, in the case in which the interpretation target is changed, an amount of data transmitted to the terminal may be reduced not by encoding the medical image as is but by generating difference information from the medical image and the display image, that is, the information that has been transmitted before the interpretation target change, and transmitting merely the difference information to the terminal.

In addition, in the server 10, the medical image is encoded using the low compression ratio and stored, so that an information amount may be reduced and stored when the medical image is compressed.

The technology discussed herein is not limited to such specific embodiments, and may be implemented by various modifications, changes, a combination of pieces of processing of the embodiments without departing from the spirit of the technology discussed herein.

For example, in the processing of FIGS. 6 and 9, "1-1" pixel may be set as the size of the block. That is, the processing may be executed not in the unit of the block but in a unit of the pixel.

In addition, an encoding scheme in which the size of the block is not fixed may be applied to the embodiments. For example, an encoding scheme in which the size of the block is selected from "4-4" pixels, "8-8" pixels, "16-16" pixel, "32-32" pixels, and the like may be applied to the embodiments.

In addition, in the processing of FIGS. 6 and 9, the encoding is performed after the compression ratio in the unit of the block has been determined (106 in FIGS. 6 and 406 in FIG. 9), but the encoding may be performed after compression ratios are determined for all of the blocks.

In addition, the encoding in the case of the high compression ratio in each of the embodiments may be performed using the same compression ratio as the low compression ratio.

In addition, in the processing of FIG. 18, one of the low compression ratios 1 and 2 with which difference information is encoded is selected, and in the encoding unit 24, the encoding may be performed merely by the selected compression ratio.

In addition, in the second embodiment, in the case in which the image before the interpretation target change is encoded, when the obtained pixel value is within the pixel value range, the encoding may be performed by the low compression ratios 1 and 2, and one of the pieces of encoded information may be selected and transmitted to the terminal.

In addition, in the first, second, and third embodiments, the case is described above in which the pixel value range is changed at the time of the interpretation target change, but a case in which the pixel value range is changed for the same interpretation target may also be applied to the embodiments. In this case, when the terminal 20 transmits a value indicating the changed pixel value range to the server 10, and the server 10 may obtain the changed pixel value range after having received the value that has been transmitted from the terminal 20.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A device comprising:
a memory; and
a processor coupled to the memory and the processor configured to:
when obtaining an image that is divided into a plurality of encoding blocks each including one or more pixels, generate compressed data of the image based on a range of pixel value, each of at least one first encoding block of the plurality of encoding blocks in the compressed data of the image being compressed using a first compression scheme, each of the at least one first encoding block being a encoding block that includes a pixel whose value is within the range of pixel value, each of at least one second encoding block of the plurality of encoding blocks in the compressed data of the image being compressed using a second compression scheme, each of the at least one second encoding block being a encoding block that includes no pixel whose value is within the range of pixel value, missing information in each of the at least one first encoding block by the first compression scheme being less than missing information in each of the at least one second encoding block by the second compression scheme,
transmit the compressed data of the image to another device,
in response to the compressed data of the image being transmitted to the other device in case where the range of pixel value is a first range, when the range of pixel value is changed from the first range to a second range, generate difference information of the image, the difference information being information for each of at least one third encoding block of the plurality of encoding blocks of the image that indicates a difference between missing information in the third encoding block by the second compression scheme and missing information in the third encoding block by the first compression scheme, each of the at least one third encoding block being a encoding block that include no pixel whose value is within the first range and that includes a pixel whose value is within the second range, and
transmit the difference information of the image to the other device.

2. The device according to claim 1, wherein,
a compression ratio of the first compression scheme is lower than a compression ratio of the second compression scheme.

3. The device according to claim 1, wherein,
the difference information of the image is encoded using the first compression scheme.

4. The device according to claim 1, wherein,
the difference information of the image is encoded using a compression scheme selected from a plurality of compression schemes based on encoding efficiency.

5. The device according to claim 1, wherein,
the processor is configured to store the compressed data of the image in the memory, and
the difference information of the image is generated based on decoded data of the compressed data.

6. The device according to claim 1, wherein,
the processor is configured to store another compressed data of the image in the memory, the other compressed data being generated by compressing the image using a compression scheme whose compression ratio is lower than a compression ratio of the second compression scheme, and
the difference information of the image is generated based on decoded data of the other compressed data.

7. A method comprising:
when obtaining an image that is divided into a plurality of encoding blocks each including one or more pixels, generating compressed data of the image based on a range of pixel value, each of at least one first encoding block of the plurality of encoding blocks in the compressed data of the image being compressed using a first compression scheme, each of the at least one first encoding block being a encoding block that includes a pixel whose value is within the range of pixel value, each of at least one second encoding block of the plurality of encoding blocks in the compressed data of the image being compressed using a second compression scheme, each of the at least one second encoding block being a encoding block that includes no pixel whose value is within the range of pixel value, missing information in each of the at least one first encoding block by the first compression scheme being less than missing information in each of the at least one second encoding block by the second compression scheme;
transmitting the compressed data of the image to another device;
in response to the compressed data of the image being transmitted to the other device in case where the range of pixel value is a first range, when the range of pixel value is changed from the first range to a second range, generating difference information of the image, the difference information being information for each of at least one third encoding block of the plurality of encoding blocks of the image that indicates a difference between missing information in the third encoding block by the second compression scheme and missing information in the third encoding block by the first compression scheme, each of the at least one third encoding block being a encoding block that include no pixel whose value is within the first range and that includes a pixel whose value is within the second range; and
transmitting the difference information of the image to the other device.

8. A non-transitory computer-readable medium including computer program instructions, which when executed by an information processing apparatus, cause the information processing apparatus to:
when obtaining an image that is divided into a plurality of encoding blocks each including one or more pixels, generate compressed data of the image based on a range of pixel value, each of at least one first encoding block of the plurality of encoding blocks in the compressed data of the image being compressed using a first compression scheme, each of the at least one first encoding block being a encoding block that includes a pixel whose value is within the range of pixel value, each of at least one second encoding block of the plurality of encoding blocks in the compressed data of the image being compressed using a second compression scheme, each of the at least one second encoding block being a encoding block that includes no pixel whose value is within the range of pixel value, missing information in each of the at least one first encoding block by the first compression scheme being less than missing information in each of the at least one second encoding block by the second compression scheme,
transmit the compressed data of the image to another device,
in response to the compressed data of the image being transmitted to the other device in case where the range of pixel value is a first range, when the range of pixel value is changed from the first range to a second range, generate difference information of the image, the difference information being information for each of at least one third encoding block of the plurality of encoding blocks of the image that indicates a difference between missing information in the third encoding block by the second compression scheme and missing information in the third encoding block by the first compression scheme, each of the at least one third encoding block being a encoding block that include no pixel whose value is within the first range and that includes a pixel whose value is within the second range, and
transmit the difference information of the image to the other device.

\* \* \* \* \*